US010379586B2

(12) United States Patent
Guruprasad et al.

(10) Patent No.: US 10,379,586 B2
(45) Date of Patent: Aug. 13, 2019

(54) SYSTEM AND METHOD FOR A DATA CENTER TO PROVIDE ENERGY ELASTICITY SERVICES AT DIFFERENT TIME SCALES

(71) Applicant: International Business Machines Corporation, Armonk, NY (US)

(72) Inventors: Ranjini Bangalore Guruprasad, Bangalore (IN); Shivkumar Kalyanaraman, Bangalore (IN); Dilip Krishnaswamy, Bangalore (IN); Prakash Murali, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 15/216,481

(22) Filed: Jul. 21, 2016

(65) Prior Publication Data

US 2018/0024603 A1 Jan. 25, 2018

(51) Int. Cl.
*G06F 1/26* (2006.01)
*H02J 9/00* (2006.01)
(Continued)

(52) U.S. Cl.
CPC ................ *G06F 1/263* (2013.01); *G06F 1/26* (2013.01); *H02J 3/381* (2013.01); *H02J 3/46* (2013.01); *H02J 9/00* (2013.01)

(58) Field of Classification Search
CPC ....................................................... G06F 1/263
See application file for complete search history.

(56) References Cited

U.S. PATENT DOCUMENTS

2002/0072868 A1* 6/2002 Bartone .................... H02J 3/14 702/62
2013/0328395 A1 12/2013 Krizman et al.
(Continued)

OTHER PUBLICATIONS

Sen Li et al., "Data Center Power Control for Frequency Regulation", 2013 IEEE Power & Energy Society General Meeting, Jul. 21-25, 2013, Vancouver, BC, 6 pages, IEEE Digital Library.
(Continued)

*Primary Examiner* — Kim Huynh
*Assistant Examiner* — Eric Chang
(74) *Attorney, Agent, or Firm* — Ference & Associates LLC

(57) ABSTRACT

One embodiment provides a method, including: executing, using at least one processor, computer readable program code to: identify a plurality of possibilities at the disposal of a data center for changing its energy demand in its role as a consumer of energy, wherein each of the possibilities is associated with: a time interval during which change in energy consumption of the data center is to take place; and an amount of energy to be drawn, during the time interval, by the data center from an electric provider through a connection to a power grid; wherein the plurality of possibilities are different from each other; proactively determine, based on the identified plurality of possibilities, the ability of the data center to change its energy consumption, thereby changing the amount of energy drawn by the data center from the energy provider; and communicate, to a remote device that is in direct communication with an energy supplier, data indicating the ability of the data center to change its energy consumption.

21 Claims, 5 Drawing Sheets

(51) Int. Cl.
*H02J 3/38* (2006.01)
*H02J 3/46* (2006.01)

(56) References Cited

U.S. PATENT DOCUMENTS

| | | | | |
|---|---|---|---|---|
| 2014/0039965 | A1 | 2/2014 | Steven et al. | |
| 2015/0046306 | A1 | 2/2015 | Forbes, Jr. | |
| 2015/0066225 | A1 * | 3/2015 | Chen | G06Q 50/06 700/291 |

OTHER PUBLICATIONS

David Aikema et al., "Data Centres in the Ancillary Services Market", 2012 International Green Computing Conference (IGCC), Jun. 4-8, 2012, San Jose, CA, USA, 10 pages, IEEE Digital Library.

He Hao et al., "A Generalized Battery Model of a Collection of Thermostatically Controlled Loads for Providing Ancillary Service", Fifty-first Annual Allerton Conference, Allerton House, UIUC, Illinois, USA, Oct. 2-3, 2013, 8 pages, IEEE Digital Library.

E. Sortomme, Combined Bidding of Regulation and Spinning Reserves for Unidirectional Vehicle-to-Grid, 2012 IEEE PES Innovative Smart Grid Technologies (ISGT), Jan. 16-20, 2012, Washington, DC, USA, 7 pages, 2011, IEEE Digital Library.

* cited by examiner

310A
Proactively Determine EES Capabilities
320A
Advertise EES Capabilities

310B
Receive EES Request Signals From A Requester
320B
Respond with EES Capabilities

SYSTEM AND METHOD FOR A DATA CENTER TO PROVIDE ENERGY ELASTICITY SERVICES AT DIFFERENT TIME SCALES

BACKGROUND

In an electricity market, electricity sources or generators are permitted to offer electricity output or uptake within the grid at various times. With respect to the electricity market, the electricity suppliers make bids for the electricity production output offered by the electricity generators that, once accepted, help to establish market prices and maintain balance within the grid.

A variety of entities may take part in the electricity marketplace. For example, even a non-traditional entity may act as a participant in the electricity marketplace, feeding stored electric capacity into the grid, increasing consumption of electricity temporarily, etc. For example, an electricity consumption point such as a data center may be used as a source for electricity supply, e.g., by reducing its consumption temporarily, or participating in the marketplace by increasing its electricity consumption.

BRIEF SUMMARY

In summary, one aspect of the invention provides a method, comprising: executing, using at least one processor, computer readable program code to: identify a plurality of possibilities at the disposal of a data center for changing its energy demand in its role as a consumer of energy, wherein each of the possibilities is associated with: a time interval during which change in energy consumption of the data center is to take place; and an amount of energy to be drawn, during the time interval, by the data center from an electric provider through a connection to a power grid; wherein the plurality of possibilities are different from each other; proactively determine, based on the identified plurality of possibilities, the ability of the data center to change its energy consumption, thereby changing the amount of energy drawn by the data center from the energy provider; and communicate, to a remote device that is in direct communication with an energy supplier, data indicating the ability of the data center to change its energy consumption.

Another aspect of the invention provides an apparatus, comprising: at least one processor; and a computer readable storage medium having computer readable program code embodied therewith and executable by the at least one processor, the computer readable program code comprising: computer readable program code that identifies a plurality of possibilities at the disposal of a data center for changing its energy demand in its role as a consumer of energy, wherein each of the possibilities is associated with: a time interval during which change in energy consumption of the data center is to take place; and an amount of energy to be drawn, during the time interval, by the data center from an electric provider through a connection to a power grid; wherein the plurality of possibilities are different from each other; computer readable program code that proactively determines, based on the identified plurality of possibilities, the ability of the data center to change its energy consumption, thereby changing the amount of energy drawn by the data center from the energy provider; and computer readable program code that communicates, to a remote device that is in direct communication with an energy supplier, data indicating the ability of the data center to change its energy consumption.

Another aspect of the invention provides a computer program product, comprising: a computer readable storage medium having computer readable program code embodied therewith, the computer readable program code being executable by a processor and comprising: computer readable program code that identifies a plurality of possibilities at the disposal of a data center for changing its energy demand in its role as a consumer of energy, wherein each of the possibilities is associated with: a time interval during which change in energy consumption of the data center is to take place; and an amount of energy to be drawn, during the time interval, by the data center from an electric provider through a connection to a power grid; wherein the plurality of possibilities are different from each other; computer readable program code that proactively determines, based on the identified plurality of possibilities, the ability of the data center to change its energy consumption, thereby changing the amount of energy drawn by the data center from the energy provider; and computer readable program code that communicates, to a remote device that is in direct communication with an energy supplier, data indicating the ability of the data center to change its energy consumption.

A further aspect of the invention provides a method, comprising: executing, using at least one processor, computer readable program code to: determine, from an electricity requester, at least one request for energy; determine an ability of a data center to change energy consumption, based on one or more energy usage characteristics of the data center, to fulfil the at least one request for energy; identify a plurality of time periods during which the data center can increase energy consumption or decrease energy consumption to fulfill different energy service requests based at least in part on the one or more energy usage characteristics of the data center; determine, using at least one of the plurality of time periods, that the data center is capable of fulfilling the at least one request for energy; and operating the data center to fulfill the at least one request for energy.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
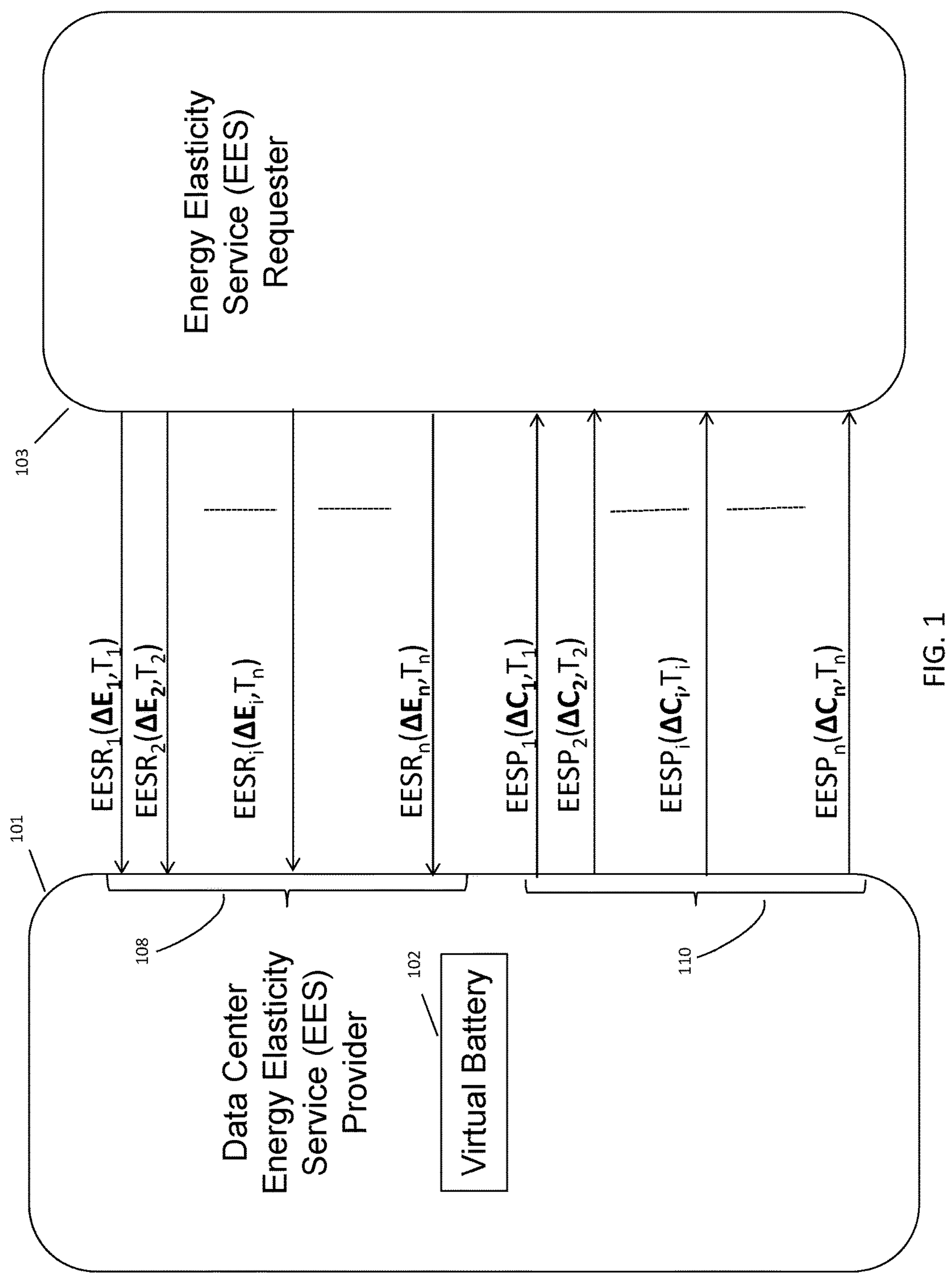
FIG. 1 illustrates an example data center that provides energy elasticity services at different time scales.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

Energy elasticity service (EES) may be defined as a service that requires an entity (EES Provider) to provide another entity (EES Requester) a range of energy elasticity, that is, a range of energy intake and energy output over a time interval, referred to as response time. The EES Provider has the capability to absorb energy or output energy per the request. The EES Provider may be an energy generator capable of moderating generation, an energy storage device that can absorb or discharge energy, or a flexible load that is capable of increasing or decreasing energy consumption. Participation of the EES Provider is characterized by the EES Provider's energy elasticity range during a time interval.

Data centers offer energy flexibility in terms of power consumption levels due to characteristics of the data center. For example, a data center offers workload flexibility in terms of jobs that may be executed, deferred, or delayed, thereby impacting the power consumption of the data center. Further, data center energy flexibility is characterized by an ability to configure various parameters that impact the power consumption of the data center. Examples of parameters that may be configured include changing the level at which resources are utilized to perform work.

The options that a data center has available to provide energy elasticity are determined by the energy flexibility characteristics of the data center. These energy flexibility characteristics may include the ability to defer a workload, schedule an additional workload, reject a submitted workload, utilize dynamic voltage and frequency scaling (DVFS) schemes, migrate virtual machines (VMs), and switch off/on components (i.e., different internal options that the data center may have).

In an embodiment, an EES Provider is formed by a data center that intelligently increases or decreases energy consumption to offer EES. The data center may increase or decrease energy consumption by utilizing workload flexibility, parameter configuration, or a combination of the foregoing.

The data center has internal time scales for taking actions that provide energy elasticity services. For example, the data center has internal time scales that impact the ability to defer a workload, schedule an additional workload, reject a submitted workload, utilize dynamic voltage and frequency scaling (DVFS) schemes, migrate virtual machines (VMs), and switch off/on components. Further, a system including other components, e.g., an alternate energy source such as a physical battery or a renewable energy source, as further described herein, likewise has internal time scales for taking actions that provide energy elasticity services. Therefore, it should be understood that these internal time scales are characteristics of the physical components, e.g., of the virtual battery or other system components.

In an embodiment, a data center's energy flexibility characteristics are used to provide EES. The data center may be considered as a virtual battery that can either charge or discharge to offer EES. The virtual battery charges by consuming more power from the electricity grid than a previous amount, whereas the virtual battery discharges by consuming less power from the electricity grid than a previous amount.

In an embodiment, a data center partitions workloads and corresponding clusters of resources into different sets to provide EES at different time scales, characterized by the EES ranges and time durations or intervals.

In an embodiment, a data center configures operating parameters to provide EES at different time scales, characterized by the EES ranges and time durations or intervals.

In an embodiment, the data center may alter the EES offered by integrating a physical battery, which may be logically combined with the virtual battery and considered as an effective battery. For example, the physical battery may be used to reduce reaction time or increase the number and type of clusters.

In an embodiment, the data center may further alter the EES offered by integrating a renewable power source, which again may be logically combined with the virtual battery.

In an embodiment, the data center may alter the EES offered at different time scales by integrating both a physical battery and a renewable power source.

In an embodiment, an EES Provider operates in one or more of a proactive or reactive mode. In a proactive mode, an EES may determine ranges and time scales for offering EES ahead of time and advertise the EES to an electricity market. In a reactive mode, an EES Provider may determine ranges and time scales for offering EES in response to requests from an EES Requester.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

As shown in FIG. 1, an example is outlined for a data center 101 to provide energy elasticity services (ESS) 110 at different time scales. An energy elasticity service at a specific time scale can be either in a positive or a negative direction relative to the current energy consumption in the data center. An EES Provider, such as a data center 101, will determine one or more energy elasticity vectors $\Delta C_i$, where each energy elasticity vector $\Delta C_i$ is specified for a corresponding time scale of response time $T_i$. As described herein, the data center 101 may do so for different time scales, where the time scales are denoted by $T_1, T_2, \ldots, T_i, \ldots, T_n$ (where $n \geq 1$), where these time scales could be specified at many scales such as several milliseconds or seconds or minutes or hours or days. The EES Provider can then advertise one or more such pairs $EESP_i(\Delta C_i, T_i)$ for each of the time scales $T_i$ that it might choose to advertise. To specify the elasticity range for a timescale $T_i$, the energy elasticity vector $\Delta C_i$ can contain a 2-tuple $(\Delta C-_i, \Delta C+_i)$ with its energy differential capability $\Delta C-_i$ in a negative direction, and its energy differential capability $\Delta C+_i$ in a positive direction. Thus the data center can specify its energy differential capabilities, $\Delta C-_i$ and $\Delta C+_i$, in both directions for a time scale of response time $T_i$. The data center as an EES Provider can provide such a 2-tuple if an EES Requester 103 is interested, for example, in knowing the elasticity capabilities in both directions in an initial negotiation phase to understand the capabilities of the EES Provider. Alternatively, $\Delta C_i$ may just be a 1-tuple with either $\Delta C-_i$ or $\Delta C+_i$ (but not both) specified for a time scale of response time $T_i$. Such a situation to specify a 1-tuple may arise for example when the data center wishes to explicitly commit its elasticity service in a specific direction for a particular time-scale. Alternatively, further, $\Delta C_i$ can just be a 0-tuple (i.e., optional and not specified) for a particular time-scale, so that the EES Provider can just provide its time scales for energy elasticity, without specifying any specific energy elasticity capability information. The data center 101 can choose to be in either a proactive or reactive mode of operation, or it can switch between proactive and reactive modes as needed. For example, the data center 101 may proactively provide its energy elasticity information at a particular time, and subsequently, at a later time reactively respond to a request from an EES Requester 103.

An EES Requester 103 can specify its anticipated energy elasticity in either direction (positive or negative) or for both directions using a vector, $\Delta E_i$, and it can also specify the time scale, $T_i$, that it desires for such elasticity. As described herein, the EES Requester 103 may do so for different time scales, where the time scales are denoted by $T_1, T_2, \ldots, T_i, \ldots, T_n$ (where $n \geq 1$), where these time scales could be specified at many scales such as several milliseconds or seconds or minutes or hours or days. The EES Requester can then specify one or more pairs $EESR_i(\Delta E_i, T_i)$ for each of the time scales $T_i$ that it might choose to specify. To specify the elasticity range for a timescale $T_i$, the energy elasticity vector $\Delta E_i$ from the EES Requester can contain a 2-tuple $(\Delta E-_i, \Delta E+_i)$ with a desired energy differential capability $\Delta E-_i$ in a negative direction, and a desired energy differential capability $\Delta E+_i$ in a positive direction. Thus the EES Requester can specify its desired energy request, $\Delta E-_i$ and $\Delta E+_i$, in both directions for a time scale of response time $T_i$, for example, in an initial negotiation phase, where the EES Requester 103 is interested understanding the capabilities of the EES Provider 101. Alternatively, $\Delta E_i$ may just be a 1-tuple with either $\Delta E-_i$ or $\Delta E+_i$ (but not both) specified for a time scale of response time $T_i$. Such a situation to specify a 1-tuple can arise for example when the EES Requester wants to explicitly request an elasticity service in a specific direction (positive or negative) for a particular time-scale. Alternatively, such a situation can arise for example when an EES Requester approves a proposed energy elasticity capability request from an EES Requester. Alternatively, $\Delta E_i$ can just be a 0-tuple (i.e., optional and not specified) for a particular time-scale, so that the EES Requester is merely interested in the ability of the EES Provider to provide energy elasticity, without the Requester specifying any specific desired elasticity information. The EES Requester 103 can send one or more EES Request signals, e.g., requests $EESR_1(\Delta E_1,T_1)$, $EESR_2(\Delta E_2,T_2)$, $EESR_3(\Delta E_3,T_3)$, . . . , $EESR_i(\Delta E_i,T_i)$, . . . , $EESR_n(\Delta E_n, T_n)$, collectively indicated at 108 of FIG. 1. The EES Requester may choose to request one or more of these signals. For example, in an initial negotiation phase, the EES Requester may specify all n request signals or a subset of these signals. This would indicate to the EES Provider the likelihood of range of future requests (ranging from a negative energy differential value to a positive energy differential value) that might arise from the Requester. During real-time operations, the EES Requester can specify only a specific direction of request for a time scale (such as a negative change or a positive change in energy utilization) as dynamically desired by the EES Requester at a given moment in time.

The data center 101 will communicate its capability, e.g., one or more of the signals $EESP_1(\Delta C_1, T_1)$, $EESP_2(\Delta C_2,T_2)$, $EESP_3(\Delta C_3,T_3)$, . . . , $EESP_i(\Delta C_i,T_i)$, . . . , $EESP_n(\Delta C_n,T_n)$, collectively indicated at 110 of FIG. 1. This communication can be done proactively by the EES Provider to an EES Requester, or it can be done reactively to acknowledge the one or more EESR request signal(s) 108 by EES Requester. It is possible also that the EES Provider may choose not to respond to a request from an EES Requester. The EES capability of the data center 101 can include one or more of the energy elasticity values in negative and positive directions denoted as $\Delta C_{1-}, \Delta C_{1+}, \Delta C_{2-}, \Delta C_{2+}, \ldots, \Delta C_{n-}, \Delta C_{n+}$ and the corresponding time scale of the capabilities, where the time scales are denoted by $T_1, T_2, \ldots T_i, \ldots, T_n$. As may be appreciated, one or more capability signals among the set of possible capability signals 110 may be sent, depending on the capability and configuration of the data center 101, as further described herein. If there is a mutual agreement between an EES Provider (here, data center 101) and an EES Requester 103, then the EES Requester 103 will pay a predetermined price (or equivalently discount the operational costs for the EES Provider 101), or a dynamically negotiated price, for the EES provided by data center 101.

The data center 101 may offer EES at differing time scales by increasing or decreasing the power or electricity consumption over differed time durations or intervals. This may be achieved by utilizing the elasticity of workload scheduling and/or the configurability of the system parameters. The number (n) of EESP or EESR signals can vary over time. At any given time, each EES Provider or EES Requester can choose to communicate or not communicate, and can choose to communicate all or some of the (n) EESP or EESR signals, respectively. At any given time, the energy elasticity capability of an EES Provider can be less than, equal to, or greater than the energy elasticity desired by an EES Requester. Each EES Provider may interact with more than one EES Requesters such as a large power grid or a local micro grid, for example. Each EES Requester 103 may interact with one or more EES Providers, such as a data center 101, or a purely renewable energy source, or other energy sources. EES Providers and EES Requesters can interact directly with each other over a network if desired. Alternatively, EES Providers and EES Requesters could interact though a marketplace where they can submit EESP and EESR signal messages respectively. An exchange of EESP or EESR signal messages between an EES Provider or an EES Requester, or submission of EESP or EESR signal messages to a marketplace can be done using packets communicated over a communication network. Such signal messages can be encoded using custom data descriptions (custom TLV (type, length, value) fields) and/or using data description standards such as XML or JSON. Such a communicated message can contain one or more EESP or EESR signal messages, so that either a single EESR or EESP signal message can be communicated, or group of EESR or EESP signal messages can be aggregated and communicated as a single message for communication over a packet communication network. EESR or EESP signal messages can be communicated using different protocols such as a REST protocol that allows CRUD (Create, Read, Update, Delete) mechanisms for data records, or using a publish-subscribe mechanism where an EES Requester can subscribe to EESP signal messages published by an EES Provider, or where an EES Provider can subscribe to EESR signal messages published by an EES Requester. An intermediate broker at the marketplace can also operate on behalf of the EES Requesters and EES Providers to match up energy elasticity requests between EES Requesters and EES Providers on demand.

In an embodiment, data center 101 partitions the workload of the data center 101 to accommodate various EES requests 108. The workload of the data center 101 can be variable in terms of computing resource requirements of workload tasks that comprise the workload, time resource requirements of workload tasks, and delay tolerance of workload tasks. For example, an analytics workload that requires k (k=8 or k=4 for example) processors for t minutes (t=30 minutes or t=60 minutes for example) can run at night with a significant delay tolerance of d hours (d=20 hours for example), that allows deferring such a workload task to a future time. Alternatively, a real-time workload task that requires an immediate response (on the order of a few milliseconds), or a pseudo-real-time task that requires a quick response (on the order of a few seconds), can have different delay tolerances relative to a reasonably delay tolerant task (on the order of a few minutes) or a highly delay tolerant task (on the order of a few hours). This variability in delay tolerances allows the data center to differentially defer or delay workload tasks. In addition, the variability in the computing requirements, or processing time requirements, offers elasticity in terms of the amount of workload that the data center 101 can execute at any given time. Additional workload requirements such as dynamic memory requirements or storage requirements, or dynamic energy requirements, or dynamic network bandwidth requirements, can also impact the elasticity in terms of the amount of workload that the data center 101 can execute at any given time.

The number of active servers, the utilization of active servers, and the operating voltage and/or frequency of the servers of the data center 101 are configurable. In an embodiment, the configurability of the data center 101 in terms of such system parameters offers elasticity to tune the system state of the data center 101.

The power consumption of the data center 101 is determined by the workload and the system state, and therefore in part impacts how the data center 101 may offer differential EES to EES Requesters 103. By way of example, in utilizing the elasticity of the workload and configurability of the system parameters, the power consumption of the data center 101 can be increased or decreased. This can be viewed as a power capacity or energy elasticity capability of the data center 101, which can be leveraged in providing EES.

Although the data center 101 can act as a flexible load, the energy elasticity of the data center 101 is constrained by the service level agreement (SLA) requirements of the users submitting jobs to the data center 101. The flexibility of the data center 101 is therefore constrained by the SLA requirements that have to be satisfied to ensure that the data center 101 native functionality of executing the jobs submitted by the users is carried out.

To accommodate the provisioning of EES at different time scales, as well as managing SLA and other restrictions of the data center 101, an embodiment treats the elasticity of the data center 101 as a virtual battery 102 that can charge or discharge as necessary in providing EES and native functionality of the data center 101.

The charging of the virtual battery 102 herein is considered as a condition where the power/electricity consumption of the data center 101 is increased, e.g., by increasing the total number of active servers. The discharging of the virtual battery 102 herein is considered as a condition where the power/electricity consumption of the data center 101 is decreased, e.g., by decreasing the number of active servers and/or their utilization. Therefore, in the example scenario of the electric grid acting as the EES Requester, if the electric grid has excess power, the virtual battery 102 can charge by increasing the power/electricity consumption of the data center 101. Likewise, when the electric grid is in need of power, the virtual battery 102 can discharge by reducing the power/electricity consumption of the data center 101. The virtual battery 102 can charge or discharge by increasing or decreasing the power or electricity consumption, which is achieved by utilizing the elasticity of the workload scheduling and the configurability of the system parameters.

The elastic energy capability of the virtual battery 102 is the charging and discharging capacity thereof. The charging and discharging capacity of the virtual battery 102 is dependent on the amount of workload that can be scheduled and deferred, the number of servers that can be switched on or off, or idled, as well as the extent of the increase or decrease in the operating voltage and/or frequency of the servers. However, the modulation of the workload execution of the data center 101, and the configurability of the system parameters thereof, has to be carried out in a manner that satisfies the SLA requirements. Therefore, the elastic energy capability of the virtual battery 102 is a function of the workload elasticity, system configurability and SLA requirements.

In an embodiment, the data center 101 is capable of clustering workloads into sets that correspond to EES responses 110, whether proactively determined or made in response to EES requests 108.

The workload of the data center 101 may be partitioned into sets to provide a corresponding number of energy elasticity services. One example of such partitioning is based on the deadline for completion of jobs in the workload of the data center 101. For example, by selecting deadline thresholds, each set of workload satisfies deadline criteria. Each set of the workload is also characterized by the time required to schedule or defer jobs, and the maximum of this time will determine the response time of the set. To cater to the sets of the workload, the number of servers of the data center 101 may be partitioned into clusters, where each cluster is catering to a set of the workload. Depending on the condition of the server(s) for each cluster (e.g., on, off, idle, operating frequency and voltage, etc.), each cluster will have a response time dictated thereby. The maximum response time of the cluster and the set of workload executing on the cluster will in turn determine the response time of that cluster.

As has been described herein, the virtual battery 102 is therefore capable of charging or discharging by increasing or decreasing the workload and system parameter settings at different time scales, e.g., per cluster. However, as described herein the alteration of the workload and system parameters occurs over time. That is, the response time is positive. The characteristics of the workload, e.g., the amount of data required from the I/O, memory, the number of computation units required for execution, etc., determine the time required to start or defer a job. Similarly, the system parameter configuration time is dependent on the time required to switch a server on or off, change the operating voltage and frequency, start or stop a virtual machine on a server for increased or decreased utilization, etc. Therefore, the response time is bounded at the low end by the time required to modulate the workload and configure the system parameters.

Figure 2:
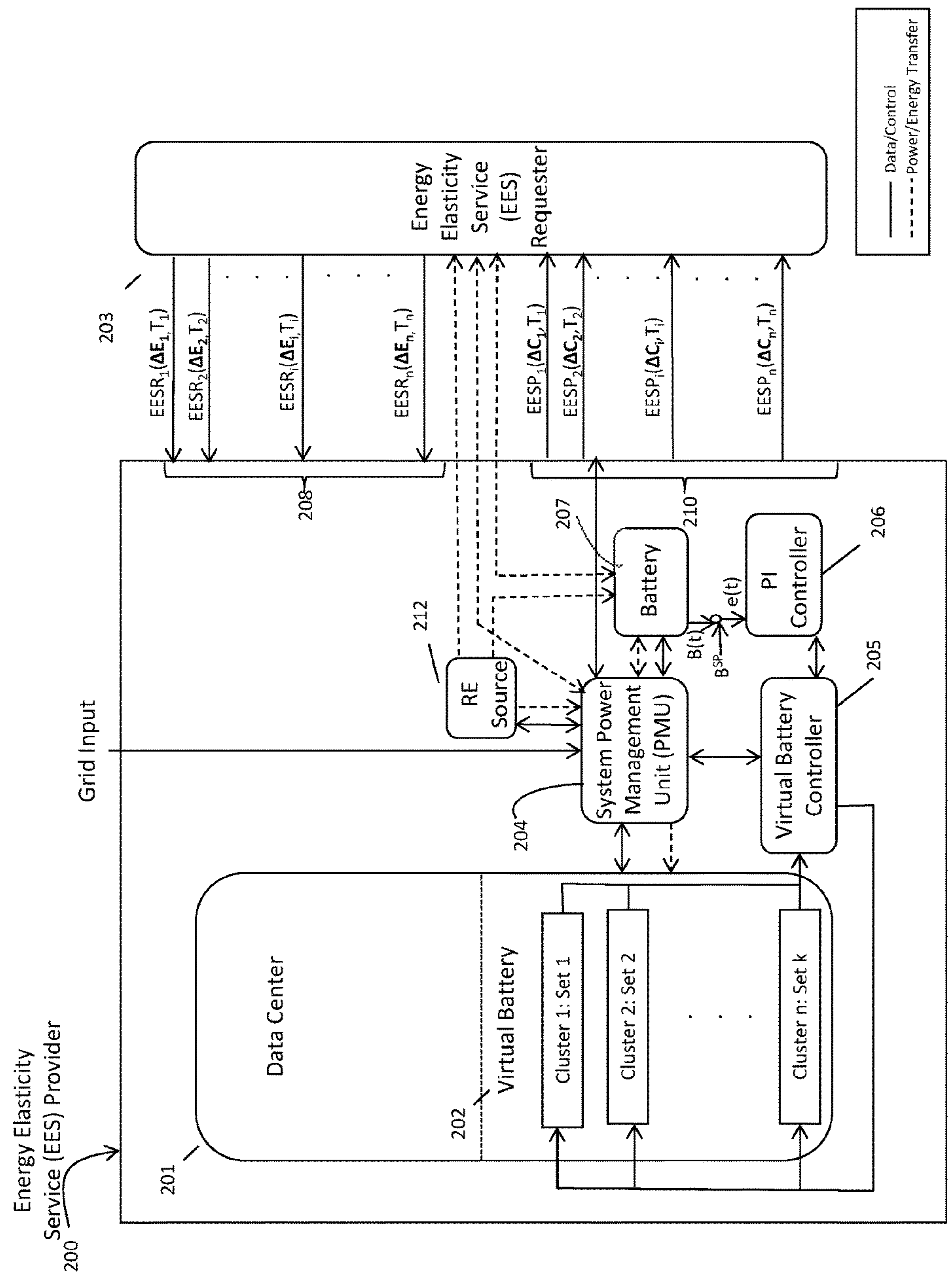
FIG. 2 illustrates an example system for providing energy elasticity services at different time scales.

Illustrated in FIG. 2, in an embodiment, other system components optionally may be utilized in order to enhance the response time of the virtual battery 202 at time scales lower than this lower bound. The additional system components, e.g., a physical battery 207, a renewable energy source 212, and a PI controller 206, are all optional.

As shown in FIG. 2, an example system 200 is outlined for a data center 201 to provide energy elasticity services (ESS) 210 at different time scales. Time scales are denoted by $T_1, T_2 \ldots, T_i, \ldots, T_n$. An EES Provider, i.e., system 200, will determine an energy elasticity range and the corresponding time scale of response time. As described herein, the system 200 may do so for different time scales. Whether in proactive or reactive mode, as further described herein, once the EES Requester 203 has chosen an EES Provider, e.g., system 200, the EES Requester 203 will send EES request signals, e.g., requests $EESR_1(\Delta E_1,T_1)$, $EESR_2(\Delta E_2,T_2)$, $EESR_3(\Delta E_3,T_3), \ldots, EESR_i(\Delta E_i,T_i), \ldots, EESR_n(\Delta E_n,T_n)$, collectively indicated at 208 of FIG. 2.

The system 200 will communicate its EES capability, e.g., the signals $EESP_1(\Delta C_1,T_1)$, $EESP_2(\Delta C_2,T_2)$, $EESP_3(\Delta C_3,T_3), \ldots, EESP_i(\Delta C_i,T_i), \ldots, EESP_n(\Delta C_n,T_n)$, collectively indicated at 210 of FIG. 2. This communication can be done proactively by the EES Provider 200 to an EES Requester 203, or it can be done reactively to acknowledge the one or more EESR request signal(s) 208 by an EES Requester 203. As may be appreciated, one or more responses 210 may be sent, depending on the capability and configuration of the system 200, as further described herein. If there is a mutual agreement between an EES Provider (here, system 200) and an EES Requester 203, then the EES Requester 203 will pay a predetermined price for the EES provided by system 200.

The system 200 may offer EES at differing time scales by increasing or decreasing the power or electricity consumption. This may be achieved by utilizing the elasticity of workload scheduling and/or the configurability of the system parameters.

In an embodiment, data center 201 partitions the workload of the data center 201 to accommodate various EES requests 208. The workload of the data center 201 is variable in terms of computing resource requirements, time resource requirements, and delay tolerance. This variability offers elasticity in terms of the amount of workload that the data center 201 can execute at any given time.

The number of active servers, the utilization of active servers, and the operating voltage and/or frequency of the servers of the data center 201 are configurable. In an embodiment, the configurability of the data center 201 in terms of such system parameters offers elasticity to tune the system state of the data center 201.

The power consumption of the data center 201 is determined by the workload and the system state, and therefore in part impacts how the system 200 may offer differential EES to EES Requesters 203. By way of example, in utilizing the elasticity of the workload and configurability of the system parameters, the power consumption of the data center 201 can be increased or decreased. This can be viewed as a power capacity or energy elasticity capability of the data center 201, which can be leveraged in providing EES.

As described herein, although the data center 201 can act as a flexible load, the energy elasticity of the data center 201 is constrained by the service level agreement (SLA) requirements of the users submitting jobs to the data center 201. The flexibility of the data center 201 is therefore constrained by the SLA requirements that have to be satisfied to ensure that the data center 201 native functionality of executing the jobs submitted by the users is carried out. To accommodate the provisioning of EES at different time scales, as well as managing SLA and other restrictions of the data center 201, an embodiment treats the elasticity of the data center 201 (and possibly other elements of the system 200, as further described herein) as a virtual battery 202 that can charge or discharge as necessary in providing EES and native functionality of the data center 201.

The charging of the virtual battery 202 is where the power/electricity consumption of the data center 201 is increased, e.g., by increasing the total number of active servers. The discharging of the virtual battery 202 is where the power/electricity consumption of the data center 201 is decreased, e.g., by decreasing the number of active servers and/or their utilization. Therefore, in the example scenario of the electric grid acting as the EES Requester, if the electric grid has excess power, the virtual battery 202 can charge by increasing the power/electricity consumption of the data center 201. Likewise, when the electric grid is in need of power, the virtual battery 202 can discharge by reducing the power/electricity consumption of the data center 201. The virtual battery 202 can charge or discharge by increasing or decreasing the power or electricity consumption, which is achieved by utilizing the elasticity of the workload scheduling and the configurability of the system parameters.

The elastic energy capability of the virtual battery 202 is the charging and discharging capacity thereof. The charging and discharging capacity of the virtual battery 202 is dependent on the amount of workload that can be scheduled and deferred, the number of servers that can be switched on or off, or idled, as well as the extent of the increase or decrease in the operating voltage and/or frequency of the servers. However, the modulation of the workload execution of the data center 201, and the configurability of the system parameters thereof, has to be carried out in a manner that satisfies the SLA requirements. Therefore, the elastic energy capability of the virtual battery 202 is a function of the workload elasticity, system configurability and SLA requirements.

In an embodiment, the workloads are partitioned into sets, indicated in FIG. 2 as Cluster 1, Set 1, Cluster 2, Set 2, . . . , Cluster n, Set k. This forms the basis of the virtual battery 202 abstraction. As such, the system 200 is capable of clustering workloads into sets that correspond to EES responses 210, whether proactively determined or made in response to EES requests 208.

The workload of the data center 201 may be partitioned into sets to provide a corresponding number of energy elasticity services. One example of such partitioning is based on the deadline for completion of jobs in the workload of the data center 201. For example, by selecting deadline thresholds, each set of workload, e.g., Set 1, satisfies deadline criteria. Each set of the workload is also characterized by the time required to schedule or defer jobs, and the maximum of this time will determine the response time of the set. To cater to the sets of the workload, the number of servers of the data center 201 may be partitioned into clusters, where each cluster is catering to a set of the workload, for e.g., Set 1 executing on Cluster 1 indicated as Set 1, Cluster 1. Depending on the condition of the server(s) for each cluster (e.g., on, off, idle, operating frequency and voltage, etc.), each cluster will have a response time dictated thereby. The maximum response time of the cluster and the set of workload executing on the cluster will in turn determine the response time of that cluster.

As may be appreciated, different clusters can have different energy elasticity capabilities in the system 200. Each cluster can have different capabilities at different time scales, and the overall energy elasticity capability for the system for a given time scale can be determined by aggregating energy elasticity capabilities across clusters for that time scale.

As has been described herein, the virtual battery 202 is therefore capable of charging or discharging by increasing or decreasing the workload and system parameter settings at different time scales, e.g., per cluster. However, as described herein the alteration of the workload and system parameters occurs over time. That is, the response time is positive. The characteristics of the workload, e.g., the amount of data required from the I/O, memory, the number of computation units required for execution, etc., determine the time required to start or defer a job. Similarly, the system parameter configuration time is dependent on the time required to switch a server on or off, change the operating voltage and frequency, start or stop a virtual machine on a server for increased or decreased utilization, etc. Therefore, the response time is bounded at the lower end by the time required to modulate the workload and configure the system parameters.

In order to enhance the response time of the virtual battery 202 at time scales lower than this lower bound, an embodiment implements a physical battery 207 (e.g., a low-capacity battery that is low cost) that is capable of responding at time scales below the lower bound. The combination of the virtual battery 202 with the physical battery 207 may be considered as a single effective battery. The effective battery also includes the virtual battery controller 205 and system power management unit (PMU) 204. The virtual battery controller 205 and the PMU 204 control the virtual battery 202 and determine the power consumption from the grid and physical battery 207, respectively. In an embodiment, aggregating internal time scale capabilities to determine the external ability to respond with energy elasticity capabilities (EESP signals) for one or more external time scales can be done in the PMU 204.

An embodiment utilizes the characteristics of signals 208 of the EES Requester 203 to control the interaction between the virtual battery and the physical battery through a proportional integral (PI) controller 206. This permits a reduction in the size of the physical battery 207, as the physical battery 207 is expected to only provide a partial energy elasticity capability relative to the overall energy elasticity capability messages 210 (particularly to provide support at lower time scales only) to provide the entire range for the EES capability of system 200 that is committed by the effective battery.

If the response required by an EES signal, e.g., one of signals 208, of the EES Requester 203 contains a given time (such as a time scale in an $EESR_i(\Delta E_i, T_i)$ signal), and the response time of the virtual battery 202 is greater than the given time, then the delay of the response of the virtual battery is determinable. The delay can be avoided if the response time of the physical battery 207 is less than the given time required for response, and the physical battery 207 responds to the request.

The battery level change due to the responding to the signal of the EES Requester 203, if such response is made, can be recouped by charging or discharging (depending on the nature of the response) the virtual battery 202 during times when the system does not respond to ESS requests. Feeding of the charge changes of the physical battery 207 directly to the virtual battery 202 may result in the virtual battery 202 attempting to track the changes. As the response time of the virtual battery 202 may be higher than that of the physical battery 207, the virtual battery 202 can find it difficult to immediately track the changing charge level of the physical battery 207.

Accordingly, an embodiment may implement a smoothing of the variation of the physical battery 207 level by using the PI controller 206. Given the battery level (B(t)), the input to the PI controller 206 is the error signal, i.e., the battery level minus the battery set point ($B_{SP}$). The output of the PI controller 206 is fed to the input of the virtual battery controller 205. The virtual battery controller 205 may be a scheduler that translates the PI controller's 206 output to workload and system parameters, by way of example.

Thus, the virtual battery controller 205 may decide to schedule or defer jobs, increase or decrease the number of active servers, increase or decrease server utilization, increase or decrease operating voltage and frequency, etc. Depending on whether the virtual battery 202 is charging or discharging, a PMU 204 can direct the flow of energy between the virtual battery 202, grid and physical battery 207. If the virtual battery 202 is discharging by reducing the power consumption of a cluster, then the virtual battery controller 205 may indicate to the PMU 204 that the amount of power drawn be equal to the decrease in power consumption from the grid and then route that power to the physical battery 207. Similarly, if the virtual battery 202 is charging, then the PMU 204 may decrease the power consumption from the grid and discharge the physical battery 207.

In an embodiment, the effective battery (virtual battery 202, virtual battery controller 205, PI controller 206 and physical battery 207) may further be augmented using a renewable energy source 212, for example a solar panel, a wind turbine, etc. For the virtual battery 202, the renewable energy source 212 may be used to power jobs that are required to be deferred or power a server that needs to be switched on, i.e., pseudo load shedding may be performed. Pseudo load shedding can be used when a job deferral or switch off of server(s) will affect an SLA requirement. Similarly, the renewable energy source 212 can also be used to charge the physical battery 207 when required to restore the battery level to a set point, e.g., when the virtual battery 202 is unable to track the output of the PI controller 206 due to lack of workload or if the data center 201 resources (e.g., servers) are fully utilized.

The elastic energy capability of the system 200 is dependent on the workload availability, system parameter configurability of the data center, SLA requirements, energy levels of the physical battery, the impact of past responses to EES requests on all of the above except the SLA requirements, and the renewable energy availability. For instance, the data center 201 may have exhausted all its workload by increasing its execution as response to one of the past energy elasticity requests. Similarly, the physical battery 207 may be discharged to a level by a response to a previous request that does not allow it to respond to a current request.

Figures 3A, 3B:
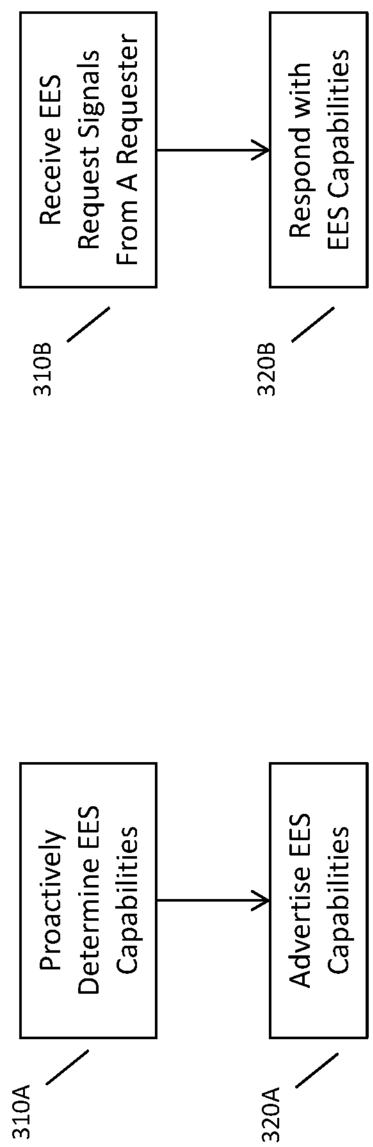
FIG. 3(A-B) illustrates example proactive and reactive modes for a data center to provide energy elasticity services at different time scales.

Turning now to FIG. 3A, an embodiment may proactively determine EES capabilities at 310A. This corresponds to a system such as system 100 partitioning a virtual battery, and potentially taking into account other available system resources such as a physical battery, to ascertain available EES, particularly offering EES at different time scales. Having determined the EES capabilities, the system may thereafter advertise these at 320A to an energy market.

As described herein, the system may receive requests for EES from an EES Requester, e.g., EES Requester 203, at 310B. In such a case, as outlined in FIG. 2, a system may thereafter determine that EES capabilities are a match for one or more of the EES requests. If so, the system may respond to the EES request(s) with the EES capabilities that have been determined.

Figure 4:
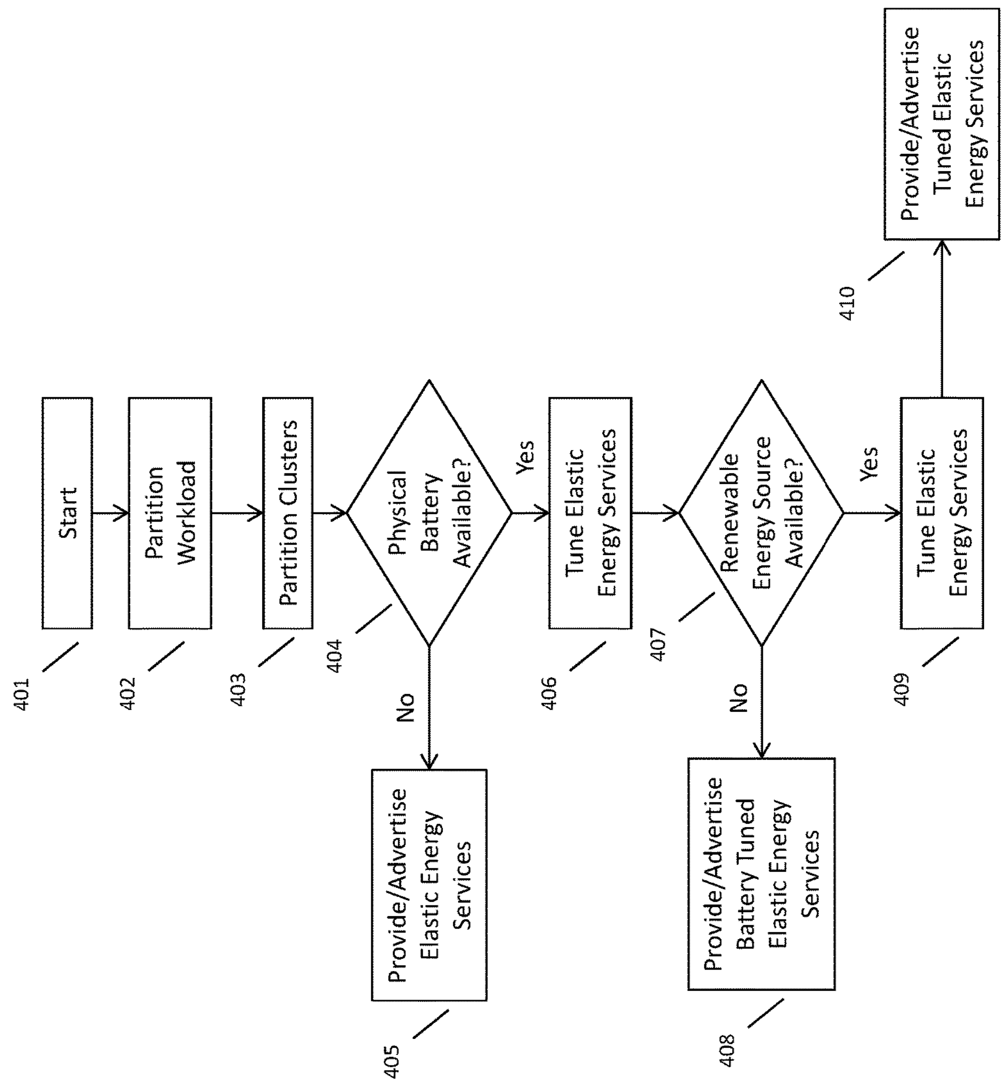
FIG. 4 illustrates an example method for a data center to provide energy elasticity services at different time scales.

Outlined in FIG. 4 is an overview of how a system may provide ESS at different time scales using a data center and other system resources. It should be noted that other system resources may include components of a system, such as system 200, that are not expressly illustrated. For example, power is consumed by other system components, such as air conditioning units, etc., that may be included in an overall system and thus controlled as part of offering EES at different time scales.

The overview provided in FIG. 4 is a non-limiting example and it should be particularly noted that the steps are not necessarily completed in a particular order. Moreover, it will be understood from the foregoing that some of the steps may not be performed at all.

At 401 a starting of a process occurs, e.g., a system determines that it should ascertain its EES capabilities and advertise them to a market, a system determines that it should respond to an EES request, etc. As such, at 402 the data center workload is partitioned such that the corresponding clusters may be identified at 403. As an alternative, or an addition to step 402, system parameters may be configured to adjust the power consumption of the system, as has been described herein. If a physical battery is not available, as determined at 404, the system may nonetheless offer EES capabilities as indicated at 405, even at different time scales according to the various clusters identified at 403 or according to the various system parameters determined, or a combination of the foregoing.

Moreover, if a physical battery is available, as determined at 404, the EES capabilities may be tuned given the physical battery's presence. For example, as described herein, the physical battery may lower the response time, and thus different or additional EES capabilities may be offered at 408.

Still further, if it is determined that a renewable energy source is available, as indicated at 407, a system may further tune EES capabilities given the presence of the renewable energy source. By way of example, the renewable energy source may be utilized in combination with the physical battery in order to tune the EES capabilities, as indicated at 409, and therefore offer different or additional EES capabilities, as indicated at 410.

At least one embodiment therefore provides a unified system consisting of a data center, a physical battery and a renewable energy source. The unified system, based on the energy elasticity capabilities of the system, determines and advertises its EES capabilities at different time scales. The data center energy elasticity is abstracted in an embodiment as a virtual battery. In an embodiment, a physical battery may be added as a way to lower response times. The renewable energy source may be used for example to implement pseudo load shedding, as has been described. With the presence of a physical battery and a renewable energy source, the unified system is capable of offering a variety of EES over different time scales.

Figure 5:
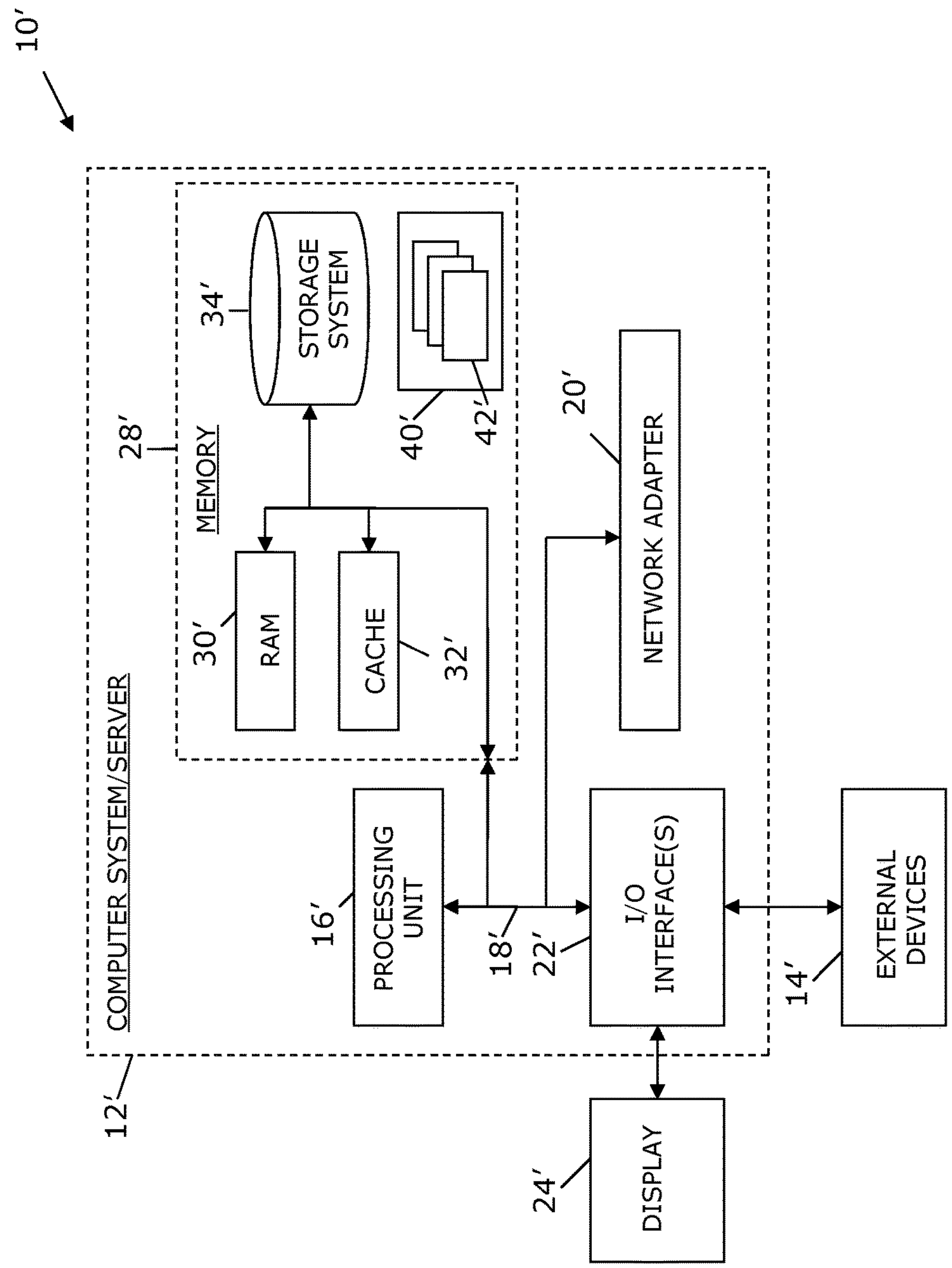
FIG. 5 illustrates a computer system according to an embodiment.

It should be appreciated that the processes, arrangements and products broadly illustrated in FIG. 1-4 can be carried out on, or in accordance with, essentially any suitable computer system or set of computer systems, which may, by way of an illustrative and non-restrictive example, include a system or server such as that indicated at 12' in FIG. 5.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method, comprising:

executing, using at least one processor, computer readable program code to:

identifying a plurality of possibilities at the disposal of a data center for changing its energy demand in its role as a consumer of energy, wherein the plurality of possibilities correspond to energy flexibility characteristics of the data center, wherein the energy flexibility characteristics comprise workload scheduling and data center component parameter configuration;

each of the possibilities being associated with:

a time interval during which change in energy consumption of the data center is to take place; and an amount of energy to be drawn, during the time interval, by the data center from an electric provider through a connection to a power grid;

wherein the plurality of possibilities are different from each other;

proactively determining, based on the identified plurality of possibilities, one or more energy elasticity ranges of the data center for a predetermined time period corresponding to the ability of the data center to change the amount of energy drawn by the data center from the energy provider, wherein each of the energy elasticity ranges identifies a lower energy consumption value for the data center and a higher energy consumption value for the data center in relation to the current energy demand of the data center and a response time required for reaching an energy consumption value within the energy elasticity range;

advertising, to a remote device that is in direct communication with an energy supplier, data indicating the ability of the data center to change its energy consumption, wherein the advertising comprises providing an identification of an energy elasticity range of the data center for a predetermined time period based on the determined one or more energy elasticity ranges to the energy supplier; and operating, in response to receiving a selection of an energy elasticity range by the remote device responsive to the advertising, the data center to change its energy consumption to fulfill the at least one request for energy.

2. The method of claim 1, further comprising changing energy consumption of the data center according to more than one of the possibilities.

3. The method of claim 2, wherein the data comprise data indicating that the data center is capable of fulfilling different energy requests having different timing requirements; and wherein the energy provider is an electric utility.

4. The method of claim 2, wherein the plurality of possibilities of the data center are based on past responses of the data center to energy requests.

5. The method of claim 1, wherein the plurality of possibilities are based on availability of a renewable energy source to the data center.

6. The method of claim 1, wherein the plurality of possibilities are based on availability of an additional physical battery to power the data center.

7. The method of claim 1, wherein the plurality of possibilities are based on energy usage characteristics of the data center selected from the group consisting of: data center work load scheduling flexibility, data center parameter configurability, availability of an additional physical battery to power the data center, and availability of a renewable energy source to power the data center.

8. The method of claim 7, wherein at least one of the additional physical battery and the renewable energy source provide a faster response time for fulfilling energy requests, compared to an otherwise identical data center lacking an additional physical battery and a renewable energy source.

9. The method of claim 1, further comprising:

determining a future estimated workload for the data center;

wherein the plurality of possibilities depend on the future estimated workload for the data center.

10. The method of claim 1, further comprising:

determining a future estimated battery level of an additional physical battery available to power the data center;

wherein the plurality of possibilities depend on the future estimated battery level.

11. The method of claim 1, further comprising:

determining a future estimated renewable energy source generation level that is estimated to be available to power the data center;

wherein the plurality of possibilities depend on the future estimated renewable energy source generation level.

12. The method of claim 1, wherein the plurality of energy capabilities are based on an energy usage characteristic of the data center selected from the group consisting of: an ability to defer workload scheduled to be completed by the data center, an ability to schedule additional workload to be completed by the data center, an ability to reject a workload submitted for completion by the data center, an ability to utilize dynamic voltage or frequency scaling for operating components of the data center, an ability to migrate virtual machines of the data center, and an ability to switch on or off one or more components of the data center.

13. The method of claim 12, wherein the data center determines one or more internal time frames for changing energy consumption based on the energy usage characteristic of the data center.

14. The method of claim 13, wherein the plurality of possibilities of the data center are aggregated across the one or more internal time frames, in response to a request from an energy requester.

15. An apparatus, comprising:

at least one processor; and a computer readable storage medium having computer readable program code embodied therewith and executable by the at least one processor, the computer readable program code comprising:

computer readable program code that identifies a plurality of possibilities at the disposal of a data center for changing its energy demand in its role as a consumer of energy, wherein the plurality of possibilities correspond to energy flexibility characteristics of the data center, wherein the energy flexibility characteristics comprise workload scheduling and data center component parameter configuration;

each of the possibilities being associated with:

a time interval during which change in energy consumption of the data center is to take place; and an amount of energy to be drawn, during the time interval, by the data center from an electric provider through a connection to a power grid;

wherein the plurality of possibilities are different from each other;

computer readable program code that proactively determines, based on the identified plurality of possibilities, one or more energy elasticity ranges of the data center for a predetermined time period corresponding to the ability of the data center to change the amount of energy drawn by the data center from the energy provider, wherein each of the energy elasticity ranges identifies a lower energy consumption value for the data center and a higher energy consumption value for the data center in relation to the current energy demand of the data center and a response time required for reaching an energy consumption value within the energy elasticity range;

computer readable program code that advertises, to a remote device that is in direct communication with an energy supplier, data indicating the ability of the data center to change its energy consumption, wherein the advertising comprises providing an identification of an energy elasticity range of the data center for a predetermined time period based on the determined one or more energy elasticity ranges to the energy supplier; and computer readable program code that operates, in response to receiving a selection of an energy elasticity range by the remote device responsive to the advertising, the data center to change its energy consumption to fulfill the at least one request for energy.

16. A computer program product, comprising:

a computer readable storage medium having computer readable program code embodied therewith, the computer readable program code being executable by a processor and comprising:

computer readable program code that identifies a plurality of possibilities at the disposal of a data center for changing its energy demand in its role as a consumer of energy, wherein the plurality of possibilities correspond to energy flexibility characteristics of the data center, wherein the energy flexibility characteristics comprise workload scheduling and data center component parameter configuration;

each of the possibilities being associated with:

a time interval during which change in energy consumption of the data center is to take place; and an amount of energy to be drawn, during the time interval, by the data center from an electric provider through a connection to a power grid;

wherein the plurality of possibilities are different from each other;

computer readable program code that proactively determines, based on the identified plurality of possibilities, one or more energy elasticity ranges of the data center for a predetermined time period corresponding to the ability of the data center to change the amount of energy drawn by the data center from the energy provider, wherein each of the energy elasticity ranges identifies a lower energy consumption value for the data center and a higher energy consumption value for the data center in relation to the current energy demand of the data center and a response time required for reaching an energy consumption value within the energy elasticity range;

computer readable program code that advertises, to a remote device that is in direct communication with an energy supplier, data indicating the ability of the data center to change its energy consumption, wherein the advertising comprises providing an identification of an energy elasticity range of the data center for a predetermined time period based on the determined one or more energy elasticity ranges to the energy supplier; and computer readable program code that operates, in response to receiving a selection of an energy elasticity range by the remote device responsive to the advertising, the data center to change its energy consumption to fulfill the at least one request for energy.

17. The computer program product of claim 16, further comprising computer readable program code that changes energy consumption according to more than one of the plurality of possibilities.

18. The computer program product of claim 17, wherein the data indicating the ability of the data center to its change energy consumption comprise data indicating that the data center is capable of fulfilling different energy requests having different timing requirements.

19. The computer program product of claim 16, wherein the plurality of possibilities of the data center to change its energy consumption are based on availability of a renewable energy source to the data center.

20. The computer program product of claim 16, wherein the plurality of possibilities of the data center to change its energy consumption are based on availability of an additional physical battery to power the data center.

21. A method, comprising:

receiving, at an energy supplier and from an electricity requester other than a data center, at least one request for energy;

determining an ability of the data center to change energy consumption, based on one or more energy usage characteristics of the data center, to fulfil the at least one request for energy, wherein the energy usage characteristics comprise workload scheduling and data center component parameter configuration;

identifying a plurality of time periods during which the data center can increase energy consumption or decrease energy consumption to fulfill different energy service requests based at least in part on the one or more energy usage characteristics of the data center, wherein the identifying comprises determining one or more energy elasticity ranges of the data center for each of the plurality of time periods, wherein each of the energy elasticity ranges identifies a lower energy consumption value for the data center and a higher energy consumption value for the data center in relation to the current energy demand of the data center and a response time required for reaching an energy consumption value within the energy elasticity range;

determining, based upon the determined one or more energy elasticity ranges during at least one of the plurality of time periods, that the data center can change its energy consumption from the energy supplier, thereby allowing the energy supplier to fulfill the at least one request for energy; and operating the data center to change its energy consumption to fulfill the at least one request for energy.

* * * * *